(12) United States Patent
Warren

(10) Patent No.: US 6,910,304 B2
(45) Date of Patent: Jun. 28, 2005

(54) STIFFENER REINFORCED FOLDABLE MEMBER

(75) Inventor: Peter A. Warren, Newton, MA (US)

(73) Assignee: Foster-Miller, Inc., Waltham, MA (US)

( * ) Notice: Subject to any disclaimer, the term of this patent is extended or adjusted under 35 U.S.C. 154(b) by 9 days.

(21) Appl. No.: 10/233,729

(22) Filed: Sep. 3, 2002

(65) Prior Publication Data

US 2003/0182879 A1 Oct. 2, 2003

Related U.S. Application Data

(63) Continuation-in-part of application No. 10/114,236, filed on Apr. 2, 2002, now abandoned.

(51) Int. Cl.[7] .............................................. E04H 12/18
(52) U.S. Cl. ........................... 52/108; 52/653.2; 52/646
(58) Field of Search ....................... 52/108, 646, 653.2; 135/143

(56) References Cited

U.S. PATENT DOCUMENTS

| 187,078 | A | 2/1877 | Adams |
|---|---|---|---|
| 280,186 | A | 6/1883 | Johnston |
| 940,399 | A | 11/1909 | Mueser |
| 1,026,801 | A | 5/1912 | Haase |
| 1,135,809 | A | 4/1915 | Jones |
| 1,377,101 | A | 5/1921 | Sparling |
| 1,486,414 | A | 3/1924 | Brier |
| 1,769,967 | A | 7/1930 | Saurman et al. |
| 1,971,500 | A | 8/1934 | Palmer |
| 1,981,938 | A | 11/1934 | Anderson |
| 2,071,270 | A | 2/1937 | Dellinger |
| 2,210,833 | A | 8/1940 | Clough |
| 2,266,214 | A | 12/1941 | Kellems |
| 2,461,916 | A | 2/1949 | Omar |
| 2,474,431 | A | 6/1949 | Lipman et al. |
| 2,691,705 | A | * 10/1954 | Luckey .................... 200/61.86 |
| 2,695,795 | A | 11/1954 | Tamminga |
| 2,836,447 | A | 5/1958 | Wright |
| 2,905,282 | A | * 9/1959 | Miller .......................... 52/108 |

(Continued)

OTHER PUBLICATIONS

Jensen, David W., "*A Glimpse Into the World of Innovative Composite IsoTruss™ Grid Structures*", Sampe J., vol. 36, No. 5, pp. 8–16 (Sep./Oct. 2000).

Mikulas, Martin M. Jr., "*Structural Efficiency of Long Lightly LoadedTruss and Isogrid Columns for Space Applications*", National Aeronautics and Space Administration Langley Research Center, Hampton, Virginia 23665, NASA Technical Memorandum 78687, pp. 1–27, Jul. 1978.

*Primary Examiner*—Anita M. King
(74) *Attorney, Agent, or Firm*—Iandiorio & Teska

(57) ABSTRACT

A foldable member including a first structural section foldable flat and biased to have an open configuration and a second structural section also foldable flat and biased to have an open configuration. The second section is longitudinally aligned with the first structural section when both structural sections are in the open configuration. A hinged connection between the first and second structural sections allows the first structural section to be folded against the second structural section when both structural sections are folded flat.

47 Claims, 14 Drawing Sheets

U.S. PATENT DOCUMENTS

| | | | |
|---|---|---|---|
| 2,960,924 A | 11/1960 | Grott | |
| 2,986,417 A | 5/1961 | Baker | |
| 2,989,324 A | 6/1961 | O'Halloran | |
| 3,035,708 A | 5/1962 | Freeman | |
| 3,326,497 A | 6/1967 | Michelson | |
| 3,353,599 A | 11/1967 | Swift | |
| 3,357,457 A | 12/1967 | Myer | |
| 3,367,604 A | 2/1968 | Matteo | |
| 3,381,986 A | 5/1968 | Seelig | |
| 3,386,128 A | 6/1968 | Vyvyan | |
| 3,459,391 A | 8/1969 | Haynos | |
| 3,460,992 A | 8/1969 | Avilov et al. | |
| 3,473,758 A | 10/1969 | Webb | |
| 3,477,662 A | 11/1969 | Anderson | |
| 3,503,164 A | 3/1970 | Berry et al. | |
| 3,612,287 A | 10/1971 | Maltese | |
| 3,652,935 A | 3/1972 | Shaw | |
| 3,677,508 A | 7/1972 | Dillard et al. | |
| 3,690,080 A | 9/1972 | Dillard | |
| 3,691,705 A | 9/1972 | Luckey | |
| 3,707,304 A | 12/1972 | Gostling | |
| 3,733,758 A | 5/1973 | Maier et al. | |
| 3,749,133 A * | 7/1973 | Bochory | 52/108 |
| 3,757,476 A | 9/1973 | Schoen | |
| 3,776,549 A | 12/1973 | Ganis | |
| 3,818,948 A | 6/1974 | Hedges | |
| 3,836,979 A | 9/1974 | Kurland et al. | |
| 3,875,711 A | 4/1975 | Palmer | |
| RE28,672 E | 1/1976 | Wakeman | |
| 4,030,102 A | 6/1977 | Kaplan et al. | |
| 4,068,238 A | 1/1978 | Acker | |
| 4,137,686 A | 2/1979 | Kern | |
| 4,145,765 A | 3/1979 | Malone | |
| 4,148,163 A | 4/1979 | Chenin et al. | |
| 4,163,303 A | 8/1979 | Hanna | |
| 4,243,075 A | 1/1981 | McPherson et al. | |
| 4,250,679 A | 2/1981 | Burg | |
| 4,259,821 A | 4/1981 | Bush | |
| 4,266,578 A | 5/1981 | Swain et al. | |
| 4,334,391 A | 6/1982 | Hedgepeth et al. | |
| 4,365,908 A | 12/1982 | Thiboutot | |
| 4,384,163 A | 5/1983 | Rauschenbach et al. | |
| 4,417,427 A | 11/1983 | Bschorr | |
| 4,446,662 A | 5/1984 | Humphries | |
| 4,453,353 A | 6/1984 | Killop et al. | |
| 4,480,415 A | 11/1984 | Truss | |
| 4,532,742 A | 8/1985 | Miura | |
| 4,543,998 A | 10/1985 | Thomerson | |
| 4,558,911 A | 12/1985 | Ruoff | |
| 4,574,553 A | 3/1986 | Lisec | |
| 4,579,302 A | 4/1986 | Schneider et al. | |
| 4,603,521 A | 8/1986 | Engelhart | |
| 4,603,737 A | 8/1986 | Spikes | |
| 4,611,946 A * | 9/1986 | Gebelius | 52/108 |
| 4,613,870 A | 9/1986 | Stonier | |
| 4,614,502 A | 9/1986 | Nelson | |
| 4,615,543 A | 10/1986 | Cannon | |
| 4,655,022 A | 4/1987 | Natori | |
| 4,662,130 A | 5/1987 | Miura et al. | |
| 4,666,107 A | 5/1987 | Berry | |
| 4,683,610 A | 8/1987 | Richards et al. | |
| 4,686,134 A | 8/1987 | Ono | |
| 4,723,579 A | 2/1988 | Hyodo et al. | |
| 4,778,184 A | 10/1988 | Fleischer | |
| 4,798,492 A | 1/1989 | Smith | |
| 4,848,954 A | 7/1989 | Wiseman | |
| 4,887,397 A * | 12/1989 | Peterson | 52/86 |
| 4,955,742 A | 9/1990 | Marks | |
| 4,958,474 A | 9/1990 | Adams | |
| 4,960,137 A | 10/1990 | Pott et al. | |
| 5,016,374 A | 5/1991 | Engström | |
| 5,085,018 A * | 2/1992 | Kitamura et al. | 52/108 |
| 5,094,046 A | 3/1992 | Preiswerk | |
| 5,138,806 A | 8/1992 | Marx et al. | |
| 5,163,262 A | 11/1992 | Adams | |
| 5,167,160 A | 12/1992 | Hall, II | |
| 5,228,644 A | 7/1993 | Garriott et al. | |
| 5,235,788 A | 8/1993 | Maimets | |
| 5,315,795 A | 5/1994 | Chae et al. | |
| 5,319,905 A | 6/1994 | Szirtes | |
| 5,328,732 A | 7/1994 | Renna | |
| 5,355,555 A | 10/1994 | Zarelius | |
| 5,366,012 A | 11/1994 | Lohbeck | |
| 5,380,131 A | 1/1995 | Crawford | |
| 5,381,782 A | 1/1995 | DeLaRama et al. | |
| 5,390,463 A | 2/1995 | Sollner | |
| 5,402,830 A | 4/1995 | Dortzbach | |
| 5,520,476 A | 5/1996 | Marks et al. | |
| 5,520,747 A | 5/1996 | Marks | |
| 5,615,968 A | 4/1997 | Verenski et al. | |
| 5,664,380 A | 9/1997 | Hsueh | |
| 5,680,145 A | 10/1997 | Thomson et al. | |
| 5,720,452 A | 2/1998 | Mutschler, Jr. | |
| 5,785,280 A | 7/1998 | Baghdasarian | |
| 5,804,277 A | 9/1998 | Ashbee | |
| 5,833,176 A | 11/1998 | Rubin et al. | |
| 5,857,648 A | 1/1999 | Dailey et al. | |
| 5,874,133 A | 2/1999 | Cochran | |
| 5,921,048 A | 7/1999 | Francom et al. | |
| 5,924,745 A * | 7/1999 | Campbell | 285/90 |
| 5,977,932 A * | 11/1999 | Robinson | 343/895 |
| 5,984,568 A | 11/1999 | Lohbeck | |
| 6,012,522 A | 1/2000 | Donnelly et al. | |
| 6,013,890 A | 1/2000 | Hulsizer | |
| 6,028,570 A | 2/2000 | Gilger et al. | |
| 6,065,500 A | 5/2000 | Metcalfe | |
| 6,102,339 A | 8/2000 | Wu et al. | |
| 6,135,030 A | 10/2000 | Besaw | |
| 6,168,116 B1 | 1/2001 | Renshall et al. | |
| 6,178,702 B1 | 1/2001 | Hand et al. | |
| 6,217,975 B1 | 4/2001 | Daton-Lovett | |
| 6,273,634 B1 | 8/2001 | Lohbeck | |
| 6,302,277 B1 | 10/2001 | Resh | |
| 6,321,503 B1 * | 11/2001 | Warren | 52/658 |
| 6,343,442 B1 | 2/2002 | Marks | |
| 6,345,482 B1 | 2/2002 | Warren | |
| 6,374,565 B1 * | 4/2002 | Warren | 52/653.2 |
| 6,547,814 B2 | 4/2003 | Edwin et al. | |
| 6,560,942 B2 | 5/2003 | Warren et al. | |
| 2001/0010012 A1 | 7/2001 | Edwin et al. | |
| 2002/0056248 A1 | 5/2002 | Warren | |
| 2003/0019180 A1 | 1/2003 | Warren et al. | |
| 2003/0182878 A1 | 10/2003 | Warren | |

\* cited by examiner

STIFFENER REINFORCED FOLDABLE MEMBER

This application is a continuation-in-part application of application Ser. No. 10/114,236 filed of Apr. 2, 2002 now abn. That application is included herein by this reference.

FIELD OF THE INVENTION

This invention relates to a structure which can be compactly stored and then deployed to form a boom, truss, or longeron member, and collapsible trusses and other similar structures made of such members.

BACKGROUND OF THE INVENTION

Tubular columns are used for a wide variety of structural applications in which efficient structures are needed to support compressive loading, for example, in aerospace and space applications, e.g., the structures that supports solar arrays or communications antennae. See, e.g., U.S. Pat. No. 4,334,391 incorporated herein by this reference.

Tubular columns are efficient because their large internal voids reduce their mass while maintaining their stiffness and strength. However, the internal void also means that the tube occupies much more volume than the volume of its constitutive material. When the tubular structure needs to be transported for any reason, this means that the structure will occupy a larger volume that is strictly necessary.

Recently, foldable tubular members have been developed that allow complex tubular structures to be compacted for easier transport. See U.S. Pat. No. 6,321,503 incorporated herein by this reference. When folded however, these tubular trusses remain as tubes and thus their internal voids still occupy volume during transport.

Some prior art structures made of tubular members have been rendered foldable by using complex deployment actuators and mechanical latches. Inflatable structures have also been developed but inflatable structures, while exhibiting good packaging efficiency, unfortunately exhibit poor structural efficiency. Moreover, an inflation gas has must be carried adding to the weight of the overall system.

Co-pending patent application Ser. No. 10/114,236 is directed to, inter alia, a flat folding tube wherein a first thin walled structure and a second thin walled structure are both made of materials normally self-biased to form a tube but which also can be laid flat. A flexible hinge material flexibly secures the bottom end of this first thin walled structure to the top end of the second thin walled structure. A deployed rigid tube is produced when the bottom end of the first thin walled structure curves inwardly and the top end of the second thin walled structure also curves inwardly thereby locking the flexible hinge and preventing it from pivoting. For compact storage, both thin walled structures can be uncoiled or unfurled and rendered flat or substantially flat. Then, the thin walled structures can be folded together at the hinge until they lie flat, one on top of the other. If this compactly stored structure is simply released, the thin walled structures naturally unfold, begin to curl inward, and deploy to again form a tube.

This surprising result allows the tube to be folded flat for compact storage and then released and automatically or manually reconfigured as a tube useful in space applications, in other structures, and also useful alone as a boom, or as a longeron member, or in a truss structure. Mechanical latches, actuators, and/or inflation gases are typically not required, the volume occupied by the structure when folded is greatly reduced, and, at the same time, the flat folding tube is simple to manufacture and easy to deploy and use. The experimental prototype example, when made of composite material, supported a load of hundreds of pounds without buckling and yet could be folded flat into a very thin five inch wide by six inch long package.

There is a limit, however, to the strength of such a device. The column stiffness of such a tube is a function of the cross sectional area of the tube material. Increasing the cross sectional area the tube material increases the stiffness of the tube in its deployed configuration. But, too thick in cross sectional area tube material makes it difficult to fold it especially without yielding the tube material and thicker tubes also makes it more difficult to unfurl or uncoil the tube material.

In this invention, the effective cross sectional area of the tube is increased without affecting the ability to easily fold or even unfurl or uncoil the tube material resulting in a tube with a higher column stiffness when deployed.

SUMMARY OF THE INVENTION

It is therefore an object of this invention to provide a tube which can be compactly folded and is thus useful in space applications and also in other applications.

It is a further object of this invention to provide a flat folding tube which exhibits good packaging efficiency.

It is a further object of this invention to provide a flat folding tube which eliminates the need for deployment actuators, mechanical latches, and inflation gasses thereby resulting in a lighter system.

It is a further object of this invention to provide a flat folding tube can be made of a variety of different types of materials but typically composite materials.

It is a further object of this invention to provide a flat folding tube which is simple to manufacture, use and deploy.

It is a further object of this invention to provide a flat folding tube useful alone as a boom, or in a truss as a longeron member.

It is a further object of this invention to provide such a tube which exhibits good column stiffness and yet which still can be folded flat without yielding the tube material and also which can be easily unfurled.

This invention results from the realization that a structural member with improved stiffness but which still can be compactly stored is effected by at least two longitudinally aligned hingedly connected tube sections each including longitudinally extending stiffeners which add to the cross sectional area of the tube sections thus increasing their stiffness in the deployed state.

This invention features a foldable member comprising a first structural section foldable flat and biased to have an open configuration, a second structural section also foldable flat and biased to have an open configuration, the second section longitudinally aligned with the first structural section when both structural sections are in the open configuration, and a hinged connection between the first and second structural sections for folding the first structural section against the second structural section when both structural sections are folded flat.

Preferably, the first structural section includes a number of integral spaced stiffeners extending longitudinally, the second structural section also includes a number of spaced integral stiffeners extending longitudinally, and the stiffeners of the first section are hingedly attached to the stiffeners of the second structural section.

In one embodiment, the first structural section includes a foldable tube interconnecting the spaced stiffeners of the first structural section and the second structural section also includes a foldable tube interconnecting the spaced stiffeners of the second structural section.

Typically, when the first and second structural sections are folded flat, the stiffeners are interstitially arranged and the stiffeners of the first section are attached to the stiffeners of the second section by discrete hinges all of which fold in the same direction where the two structural sections are folded flat.

The first and second structural tube sections may be circumferentially continuous or, alternatively, form a seam. The foldable tubes have a wall thickness $t_1$, the stiffeners have a thickness $t_2$, and typically $t_1 \ll t_2$.

There may also be means for locking the first structural section in its open configuration with respect to the second structural section in its open configuration, and means for biasing the first section to be longitudinally aligned with the second section.

In one example, both sections are rendered flat by compressing opposite sides of the sections together. In another example, both sections are rendered flat by unfurling them.

This invention also features a first structural section including a number of longitudinally extending stiffeners, a second structural section including a number of longitudinally extending stiffeners axially aligned with the longitudinally extending stiffeners of the first section, and a hinged connection between the first and second structural sections for folding the first structural section against the second structural section.

In one preferred embodiment, the hinged connection includes a discrete hinge between the proximal end of each stiffener of the first structural section and the proximal end of each axially aligned stiffener of the second structural section. The first structural section typically includes material interconnecting the longitudinally extending stiffeners thereof, said material biased to have an open configuration. The second structural section also includes material interconnecting the longitudinally extending stiffeners thereof, said material also biased to have an open configuration. In one example, the material forms a foldable tube. In another example, the material forms a plurality of flexible struts. In still another example, the material forms an unfurlable tube. Preferably, in all examples, the material and the stiffeners are integral and made of composite material.

This invention also features a first structural section including spaced stiffeners extending longitudinally, the first structural section biased into an open configuration but unfurlable into a flat configuration, a second structural section also including spaced stiffeners extending longitudinally, the second section biased into an open configuration but unfurlable into a flat configuration, and a hinged connection between the first and second structural sections such that when they are both unfurled they can be folded together about each other.

In one example, the hinged connection includes a pliable hinge interconnecting the proximal end of the first section to the proximal end of the second section. Alternatively, or in addition, the hinged connection includes discrete hinges each interconnecting a stiffener of the first section to a stiffener of the second section. Typically, the first section forms a tube and the second section forms a tube and the stiffeners are integral with the tubes.

This invention also features collapsible truss structures including one or more foldable members as disclosed herein.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
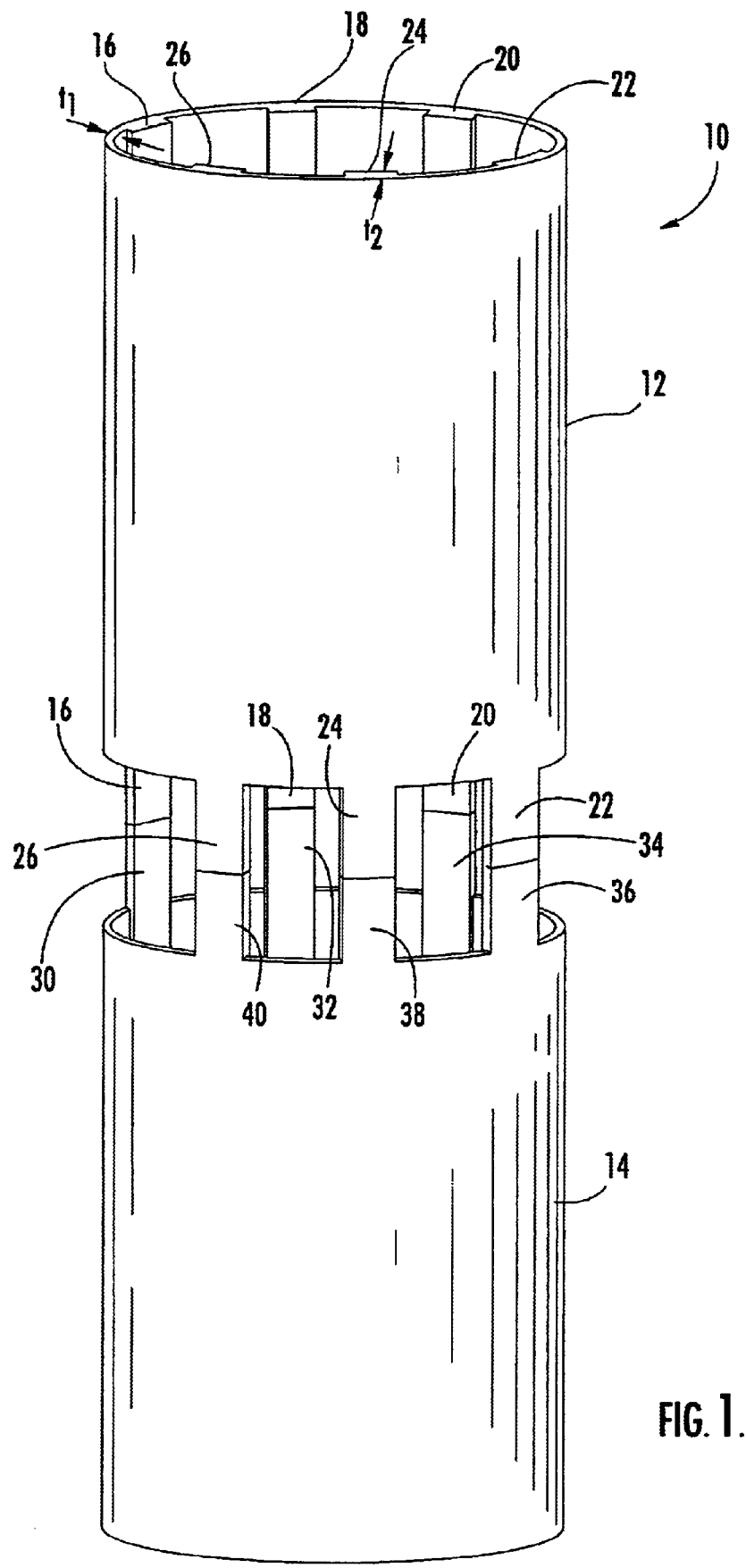
FIG. 1 is a schematic view showing one side of a flat folding tube in accordance with the subject invention.
Figure 2:
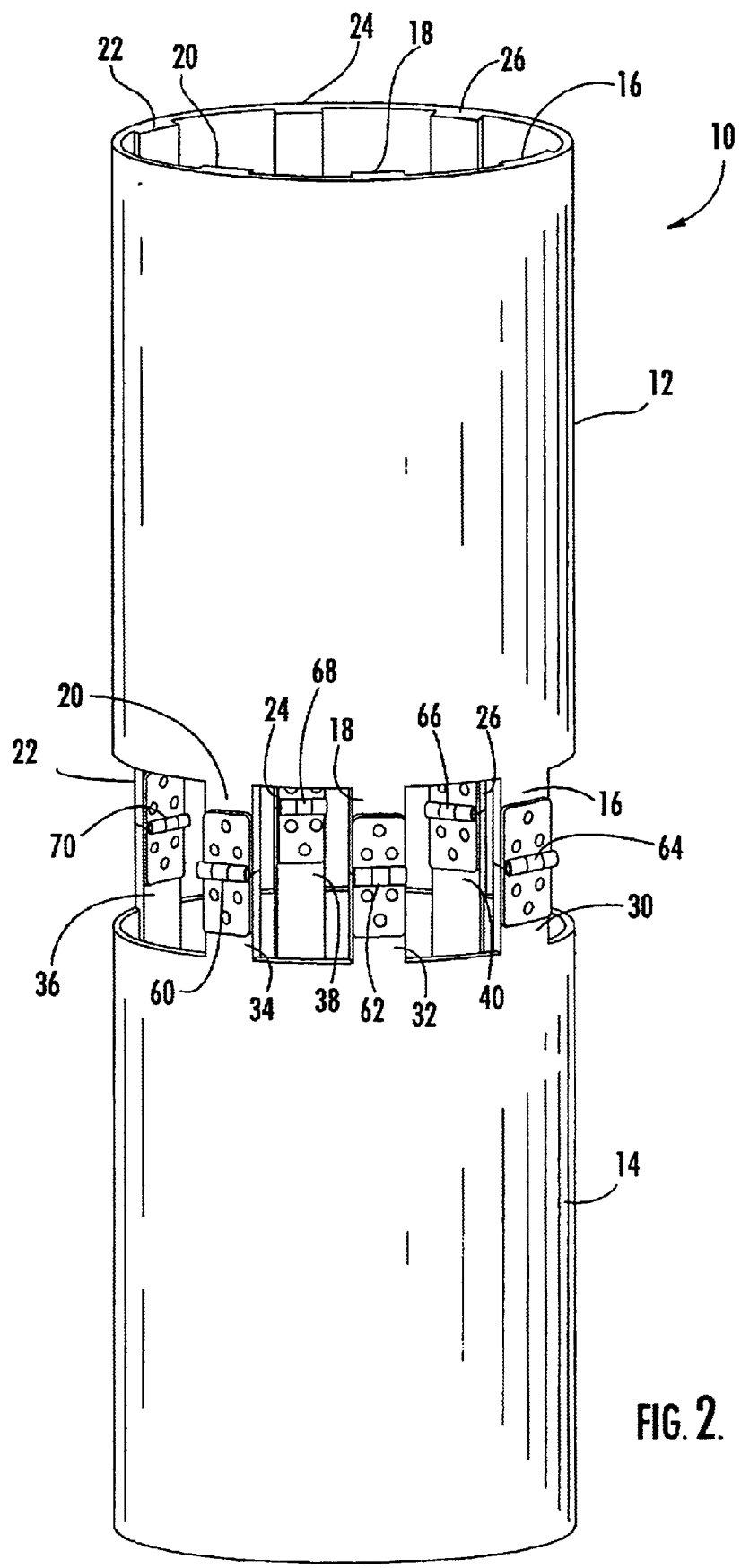
FIG. 2 is another schematic view showing the opposite side of the flat folding tube of FIG. 1.
Figure 3:
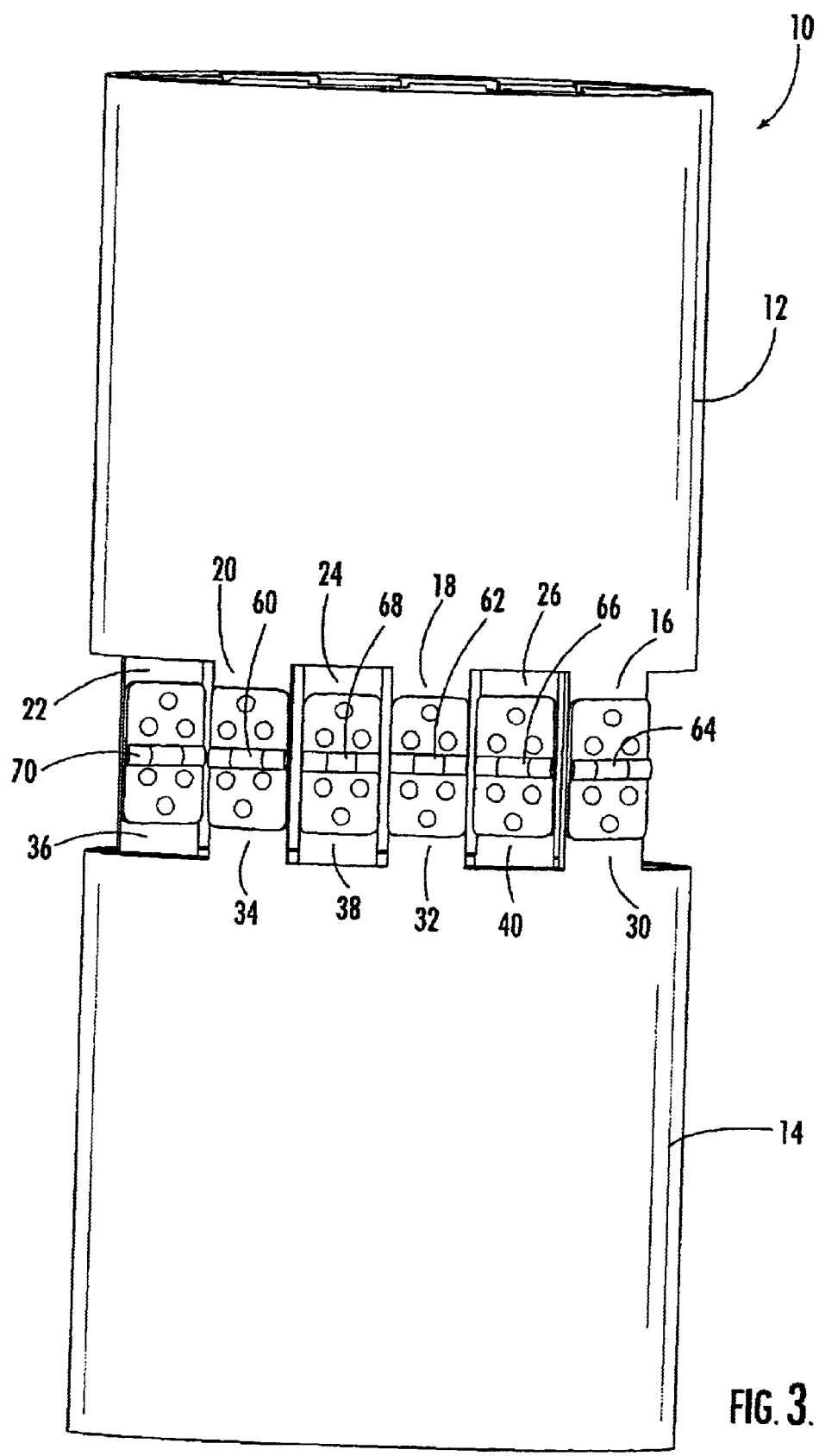
FIG. 3 is a schematic view showing the structure of FIG. 2 folded flat.

In one embodiment, foldable member 10, FIGS. 1–4 includes first 12 and second 14 longitudinally aligned tube sections made of a material which can be folded flat (see FIGS. 3–4) but biased to normally have an open construction or configuration as shown in FIGS. 1–2. One such material is composite material including carbon fibers and a resin matrix. Both sections 12 and 14 preferably include integral spaced longitudinally extending stiffeners also made of composite material. In, FIGS. 1–4, tube section 12 includes six stiffeners 16, 18, 20, 22, 24, and 26 and tube section 14 includes six stiffeners, 30, 32, 34, 36, 38, and 40. There is a hinged connection between tube sections 12 and 14 which, in this embodiment, includes discrete hinges connecting the stiffeners of section 12 and the corresponding stiffeners of section 14: hinge 60 hingedly interconnects stiffeners 20 of section 12 with stiffener 34 of section 14, hinge 62 interconnects stiffeners 18 and 32, hinge 64 interconnects stiffener 16 and 30, hinge 66 interconnects stiffeners 26 and 40, hinge 68 interconnects stiffeners 24 and 38, and hinge 70 interconnects stiffeners 22 and 36. Typically, the hinges are configured so that they only fold one way and so that all the hinges fold in the same direction when both tube sections are rendered or compressed flat as shown in FIG. 3 and the stiffeners and hinges are interstitially arranged as shown.

Figure 4:
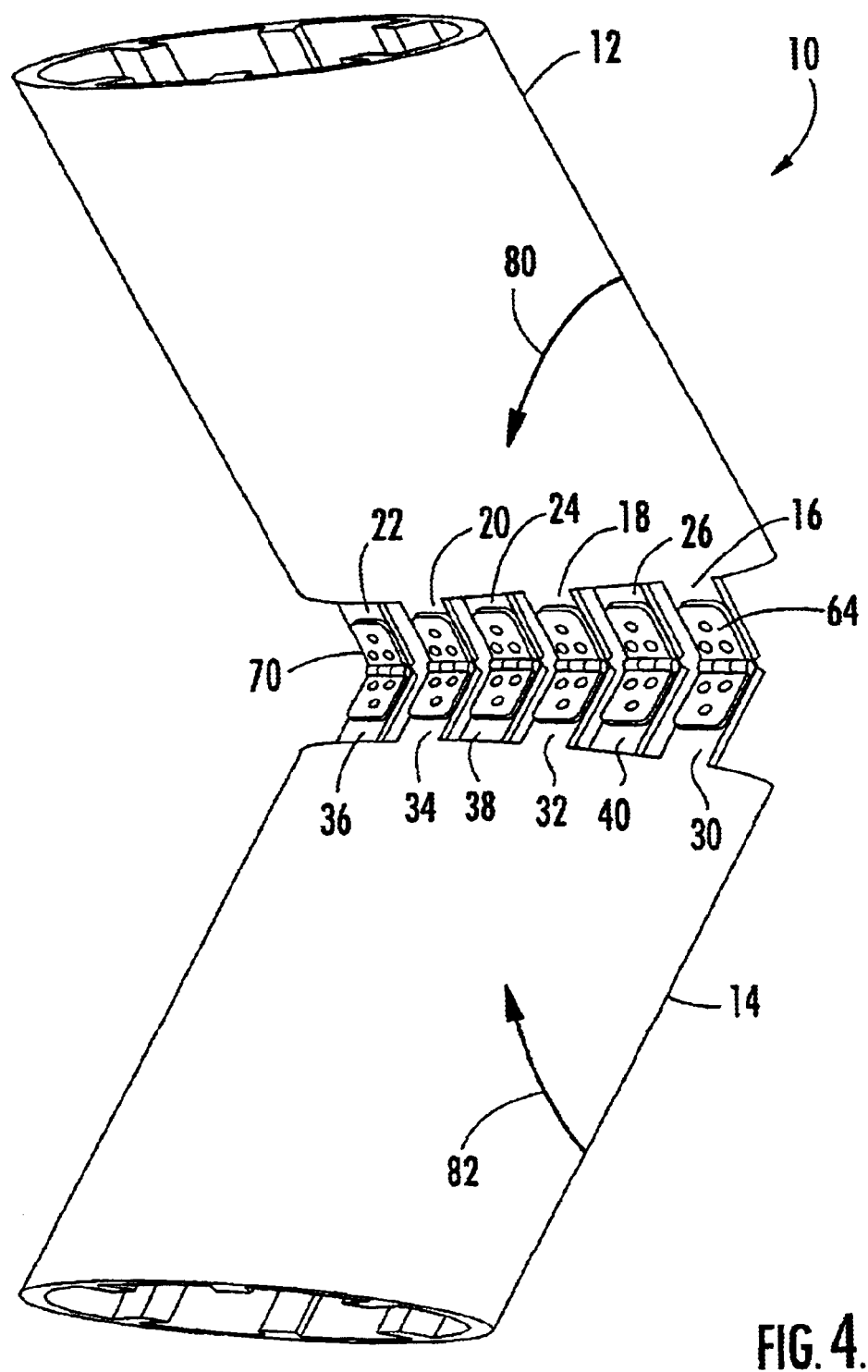
FIG. 4 is a schematic view showing how both sections of the flat folded tube of FIG. 3 are brought together for compact storage.
Figure 5:
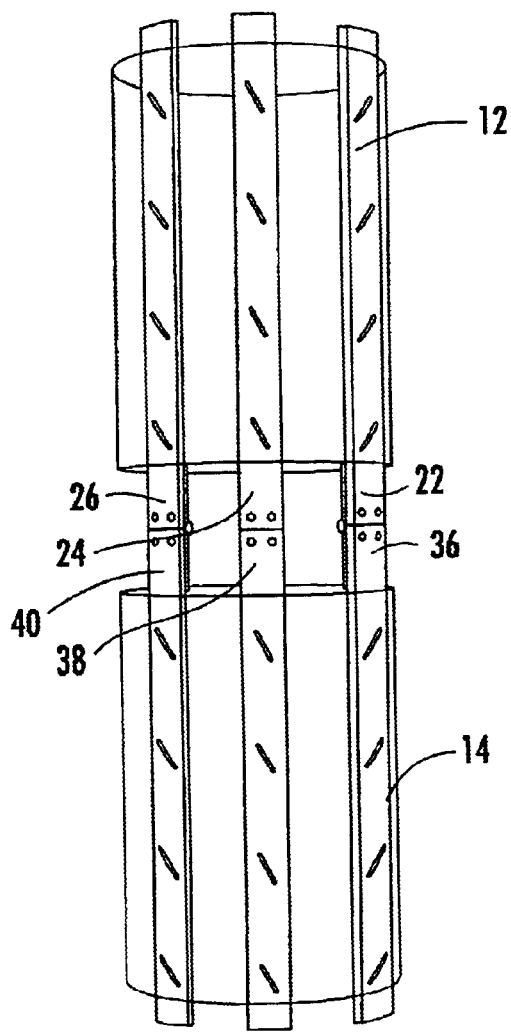
FIGS. 5–7 are schematic views showing a working model of the flat folding tube of the subject invention in its deployed state.
Figure 6:
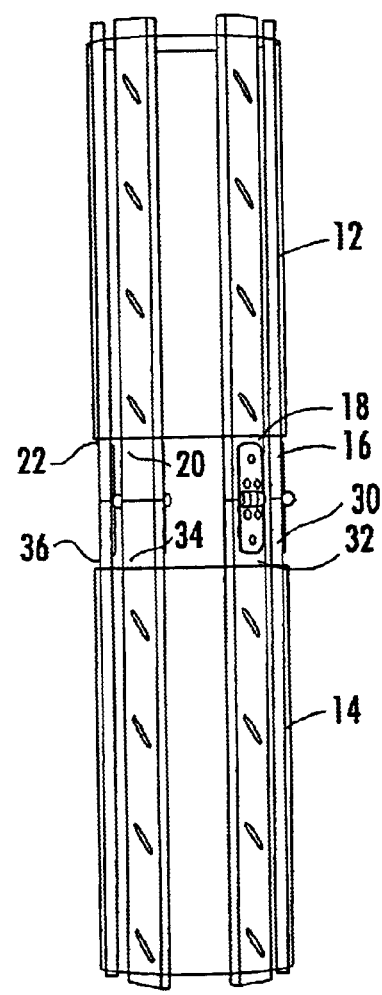
Figure 7:
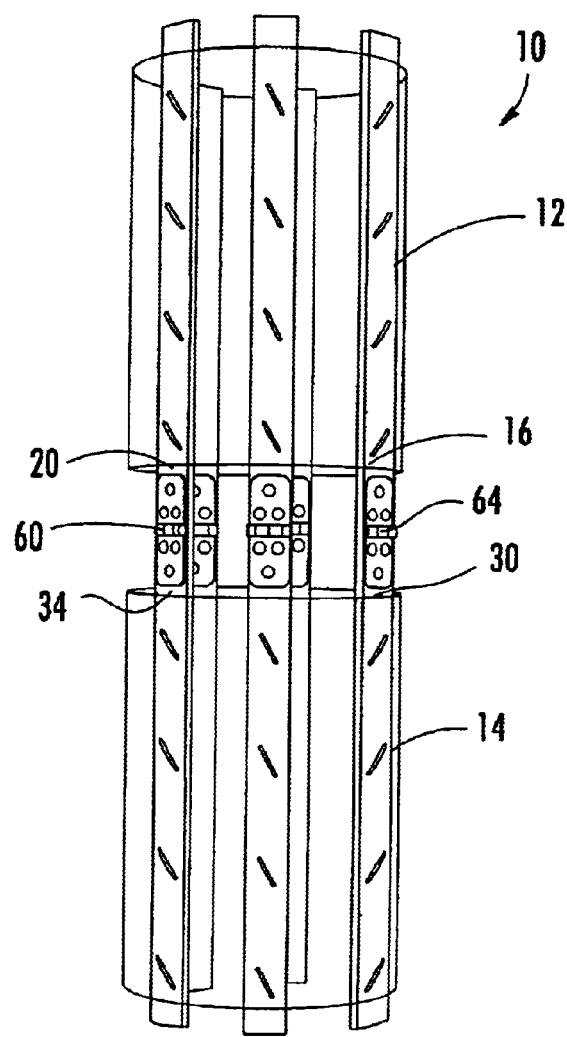

In this way, tube sections 12 and 14 can be compressed flat to a position where the interstitially arranged hinges between the corresponding longitudinally aligned stiffers line up to allow first flat section 12 to be folded against second flat section 14 in the direction shown by arrows 80 and 82, FIG. 4. When released, however, sections 12 and 14 return to the open aligned configurations shown in FIGS. 1–2.

FIGS. 1–4 are highly schematic. In a complete system, a long tubular column used in spaced applications would include many such tube sections foldable with respect to each other so that a solar array or communications antenna assembly could be folded flat for compact storage on the space shuttle and then easily unfolded and deployed in space.

Figure 8:
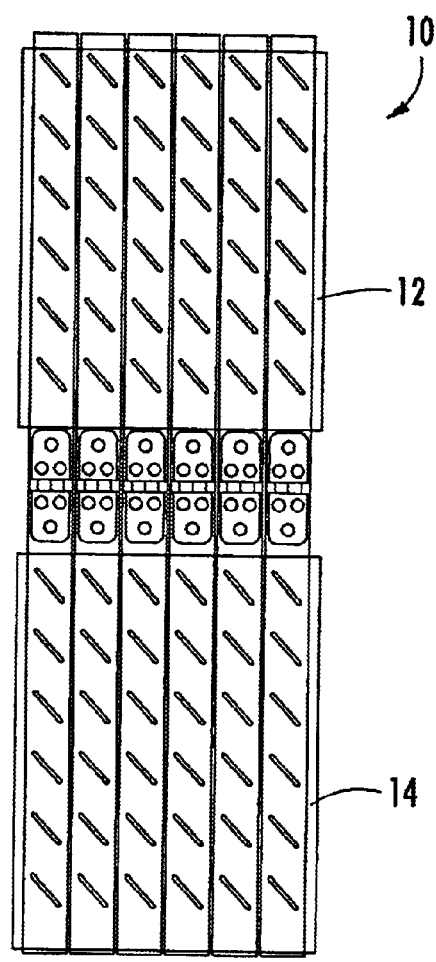
FIG. 8 is a schematic view showing the working model of FIGS. 5–7 in its flat state.
Figure 9:
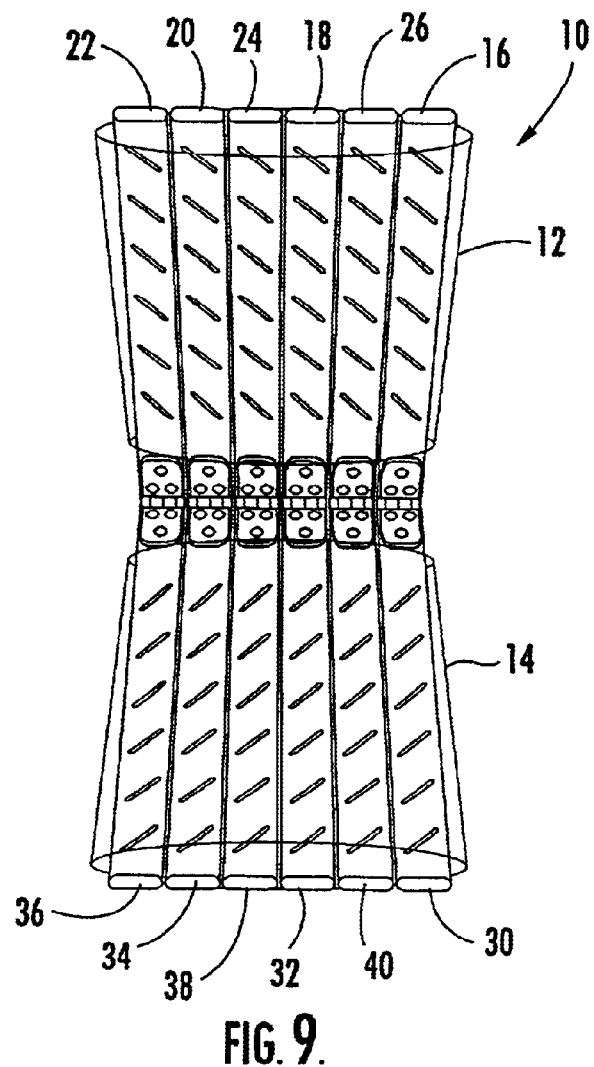
FIG. 9 is a schematic view of the working model of FIGS. 5–8 being folded in half.
Figure 10:
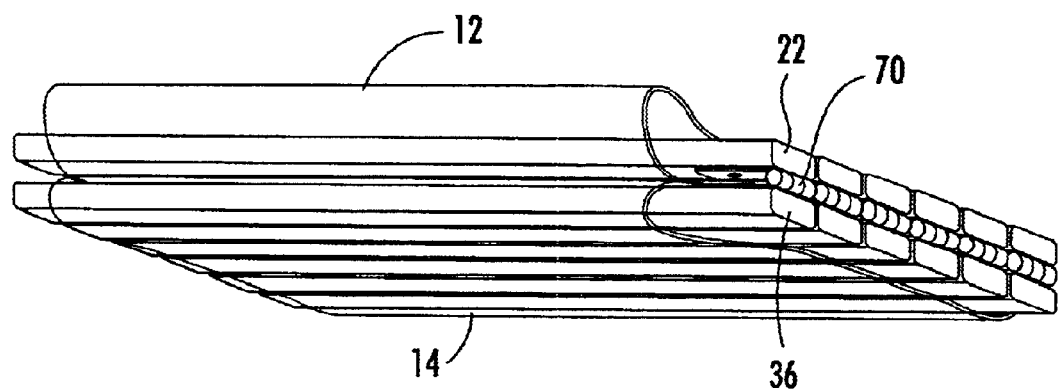
FIG. 10 is a schematic view showing the working model of FIGS. 5–9 folded flat for storage.

FIGS. 5–10 depict a working model of the embodiment of the subject invention discussed above with reference with FIGS. 1–4. For clarity, not all of the reference numbers are shown. In FIG. 8, both sections 12 and 14 are flattened by compressing the opposite sides of each section. In FIG. 9, the hinged connection between both sections in their flat configuration allow them to be folded together until the compact folded configuration of FIG. 10 is reached. Upon deployment, the reverse procedure is effected and the two sections unfold as shown in FIG. 9 to the aligned state shown in FIG. 8, and by simply releasing the compression force which folds the tube sections flat, they automatically spring into the open configuration shown in FIG. 7.

In the working model of FIGS. 5–10, the material of tube sections 12 and 14 was Lexan and the stiffeners were made of wood. More typically, but not necessarily, the tube sections will be made of a composite material and the stiffeners, also made of a composite material, are formed to be integral with the corresponding tube sections as shown in FIGS. 1–4.

The primary purpose of the stiffeners is to increase the column stiffness of the device without adversely effecting the ability to flatten it (see FIGS. 3 and 8) and also without adversely effecting the ability to bring both tube sections together (see FIGS. 4 and 9–10). In essence, the stiffeners increase the average cross sectional area of the tube material in the deployed configuration (see FIGS. 1–2 and 5–7). This increase in cross sectional area improves the column stiffness and strength of the structure. By aligning the stiffeners of each tube section and hingedly interconnecting them, however, both sections can still be flattened and folded together.

As discussed above, the figures hereof are highly schematic and the stiffeners are not as thick as depicted in the figures. In the embodiments discussed so far, both foldable sections include a circumferentially continuous tube wall of thickness $t_1$, FIG. 1 while the stiffeners, as shown for stiffener 24, have a thickness $t_2$. Preferably, $t_1$ is much less then $t_2$. In this way, because of the thinness of the material comprising the two foldable together sections, they can both be folded flat as shown in FIGS. 3 and 8 and yet, when deployed as shown in FIGS. 1–2 and 5–7, the added average wall thickness by virtue of the thicker stiffeners provide a sharp increase to the compressive stiffness and to the buckling strength of the resulting structure.

Those skilled in the art will understand how to select the thickness of the tube structures, the thickness of the stiffeners, the material to use for the tube structures and stiffeners, and the number of stiffeners and their width depending on the specific implementation.

Figure 11:
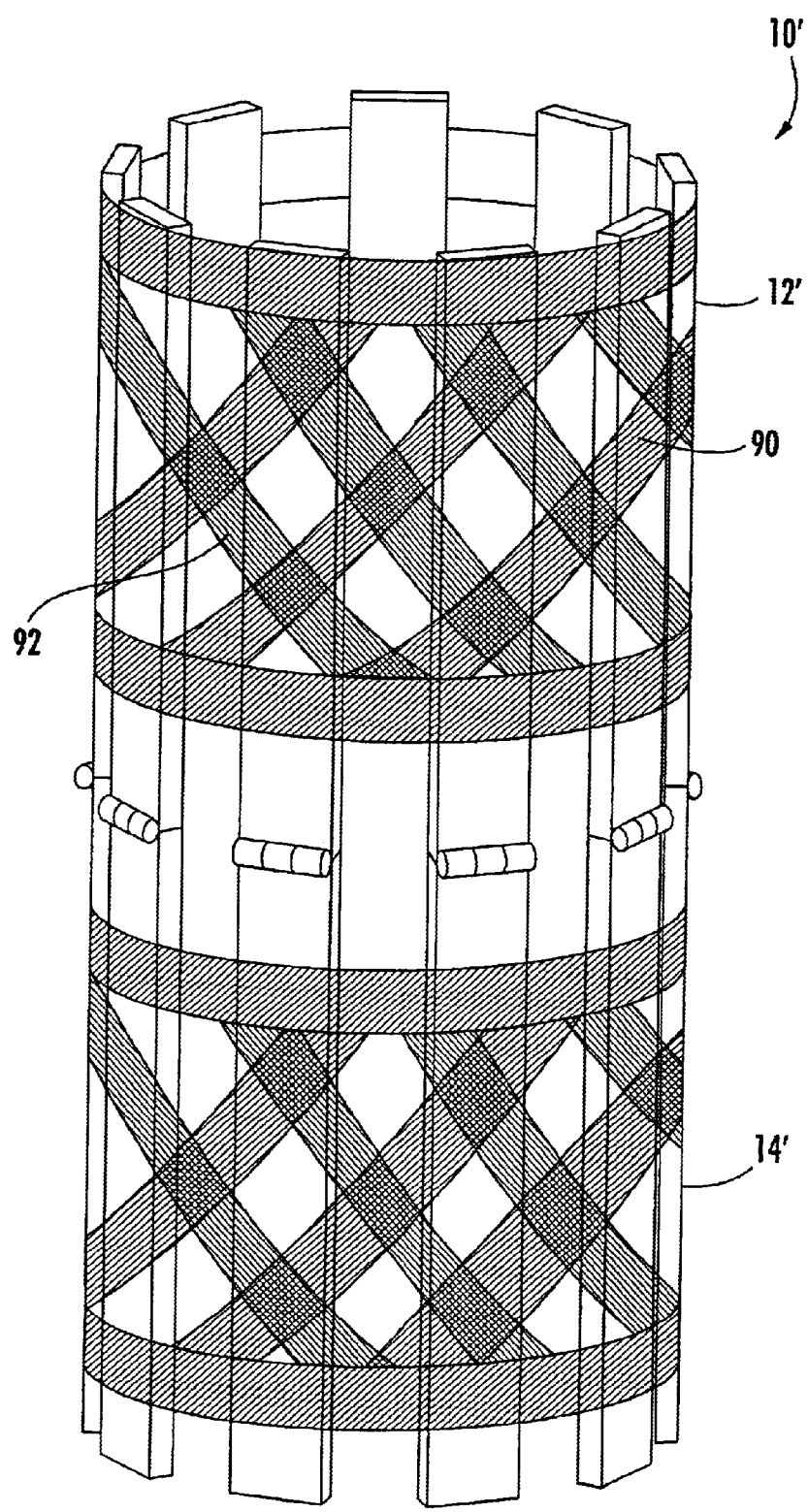
FIG. 11 is a schematic front view of another embodiment of the flat folding tube of the subject invention.

The use of a continuous tube as the structure for each section as discussed thus far is not a limitation of this invention. In the embodiment of FIG. 11, foldable member 10' still includes two sections 12' and 14' each including the longitudinally extending stiffeners shown but, instead of material forming tubes, flexible struts 90,92 etc. interconnect the spaced stiffeners of the first and second structural sections both of which can still be flattened and then folded together the same way shown for the first embodiment discussed above.

Figure 12:
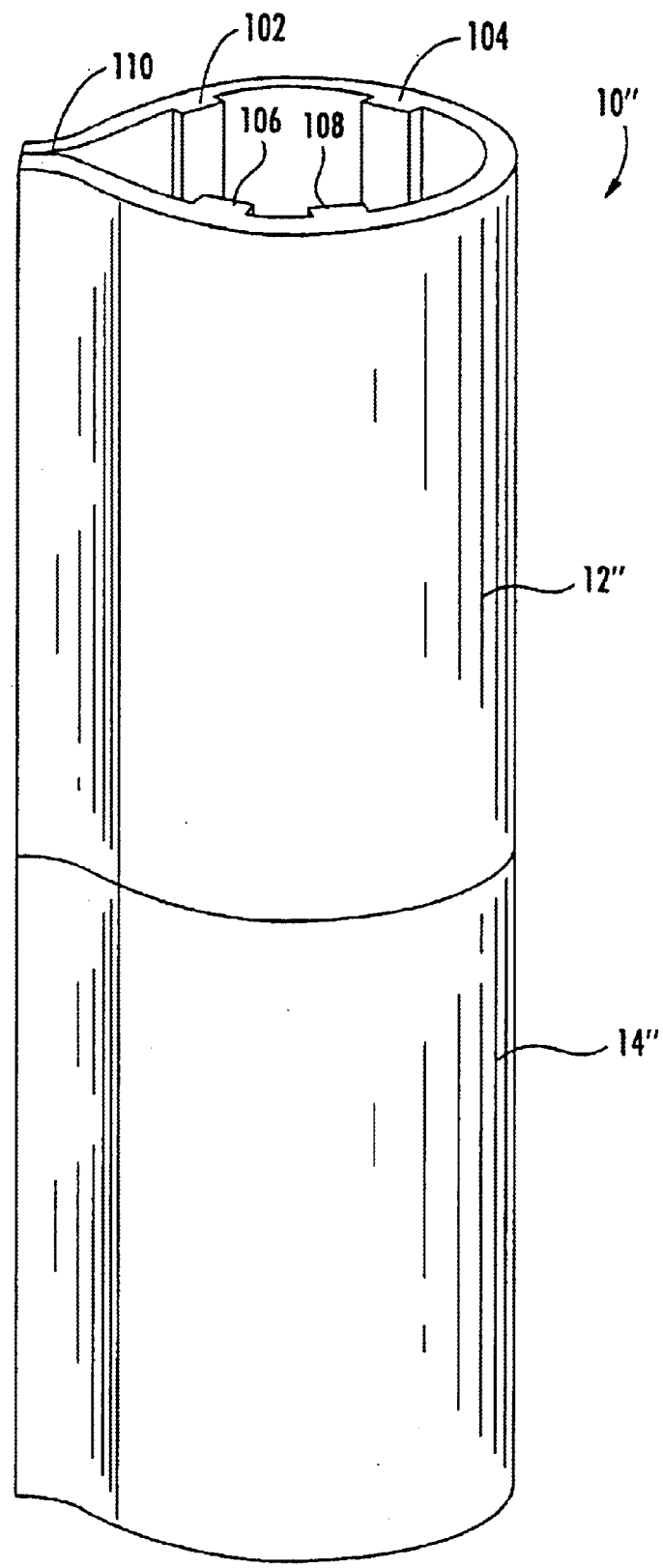
FIG. 12 is a schematic view showing another embodiment of a folding tube of the subject invention which is unfurled to render it flat.
Figure 13:
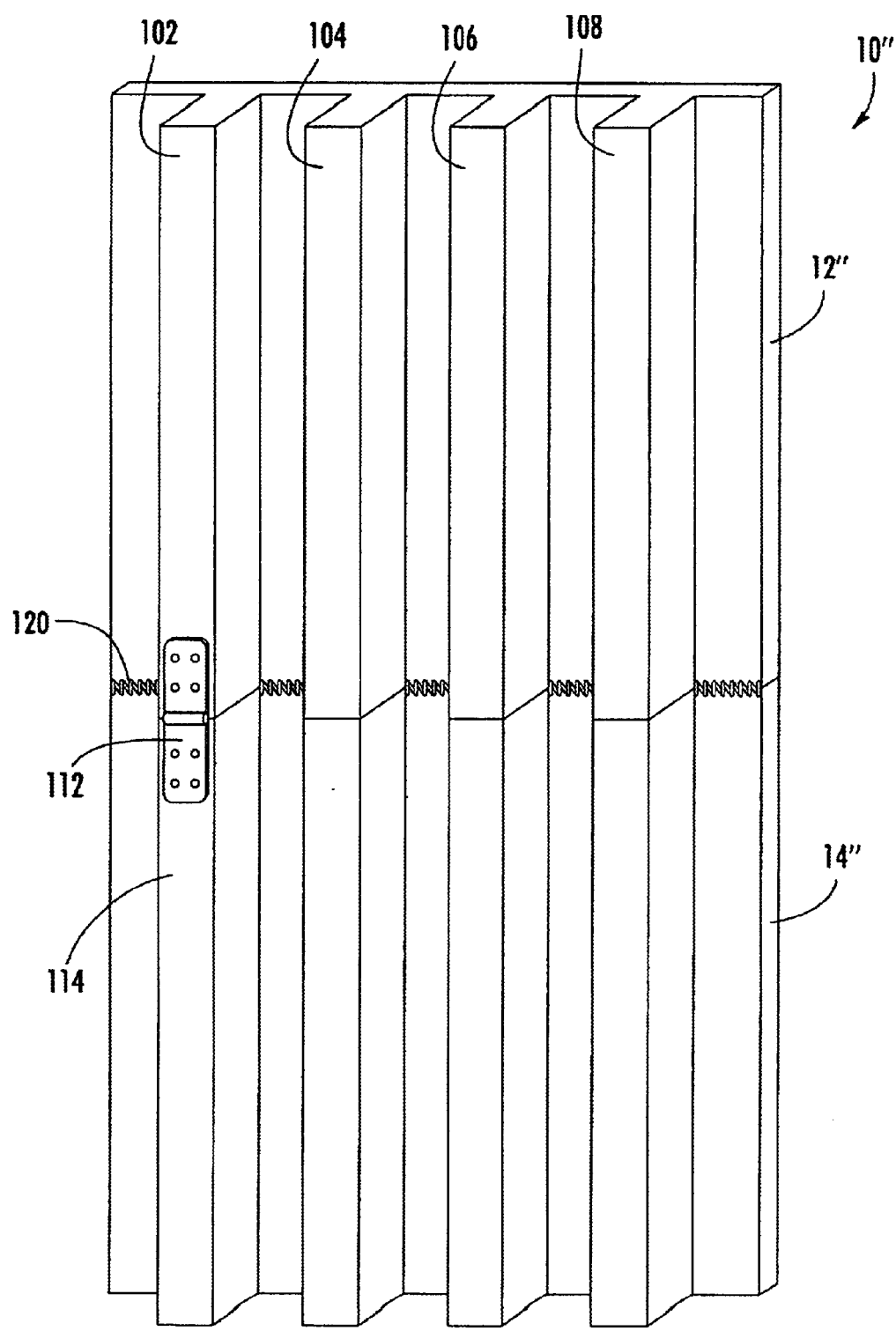
FIG. 13 is a schematic view showing the tube of FIG. 12 in its unfurled laid out flat configuration.

Thus far, the first and second sections are flattened by compressing the opposing sides thereof. This, however, is also not a limitation of the subject invention. As shown in FIGS. 12 and 13, sections 12" and 14" of structure 10" both include longitudinally extending stiffeners (see stiffeners 102, 104, 106, and 108 of section 12") which are hingedly joined to the corresponding axially aligned stiffeners of section 14" (not shown in FIG. 12). The composite tubes of section 12" and 14", however, are not circumferentially continuous. Instead, seam 110 is formed which may be locked together by a fastener in the deployed state shown in FIG. 12. For compact storage of this structure, however, tube sections 12" and 14" are flattened by unfurling them as shown in FIG. 13. Then, discrete hinge 112 between the proximal end of stiffener 102 of section 12" and the proximal end of axially aligned stiffener 114 of section 14" and similar hinges (not shown) connecting the other stiffeners, allows section 12" and 14" to be folded together. Alternatively, or in addition, a pliable hinge between the material of the tube sections 12" and 14" as shown at 120 can form the hinged connection between both sections. Further details concerning the selection of the material of tube sections 12" and 14", the hinge connection between them, and various looking mechanisms and tube configurations are discussed in application Ser. No. 10/114,236 previously incorporated herein. Alternatively, in the embodiment shown in FIGS. 12–13, the flexible struts of FIG. 11 may be employed instead of tubes.

Figure 14:
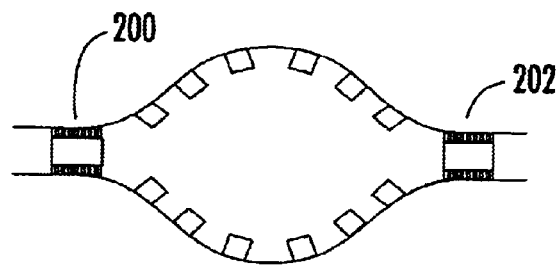
FIG. 14 is a cross-sectional schematic view of a lenticular shaped flat folding tube in accordance with this invention in its deployed shape.
Figure 15:
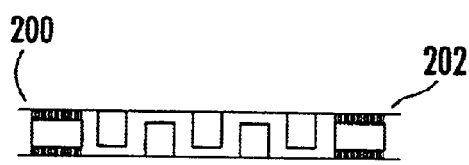
FIG. 15 is a cross-sectional schematic view of the tube of FIG. 14 folded flat.
Figure 16:
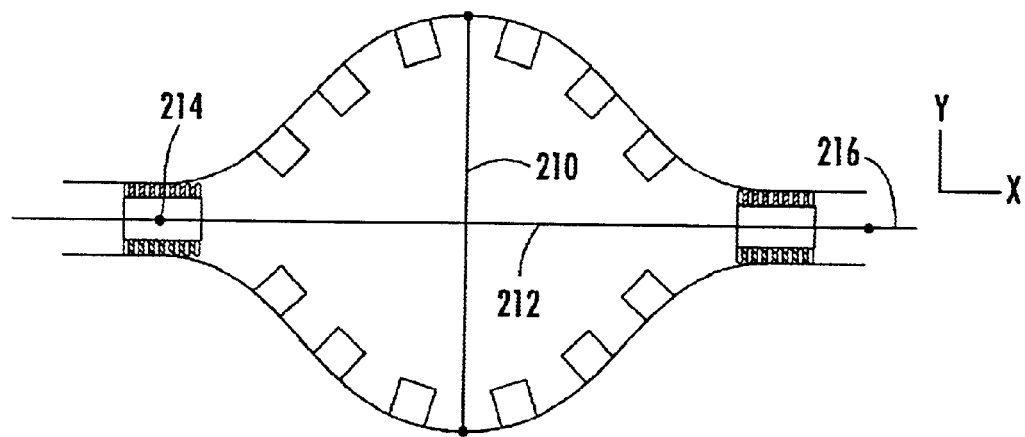
FIG. 16 is a schematic cross-sectional view of an embodiment of this invention employing tensile members.

In designs where flattening is accomplished by compressing the tube sections, it may be desirable to employ a lenticular shape as shown in FIGS. 14 and 15 to reduce the stress radius at end portions 200, 202. FIG. 16 shows the use of tensile elements 210 and 212 (e.g., Kevlar threads or rods) extending as shown periodically along the length of the tube sections. Tensile element 210 prevents further deformation in the direction of the Y-axis while tensile element 212 prevents further deformation in the direction of the X-axis. Also, one tensile element, for example tensile element 212 can be used to drive the flattened tube from the flattened state to the open configuration by locking end 214 and pulling on end 216 in the direction of the X-axis. Tensile element 210 prevents over-extension and end 216 of the tensile element 212 may then be locked in place.

Figure 17:
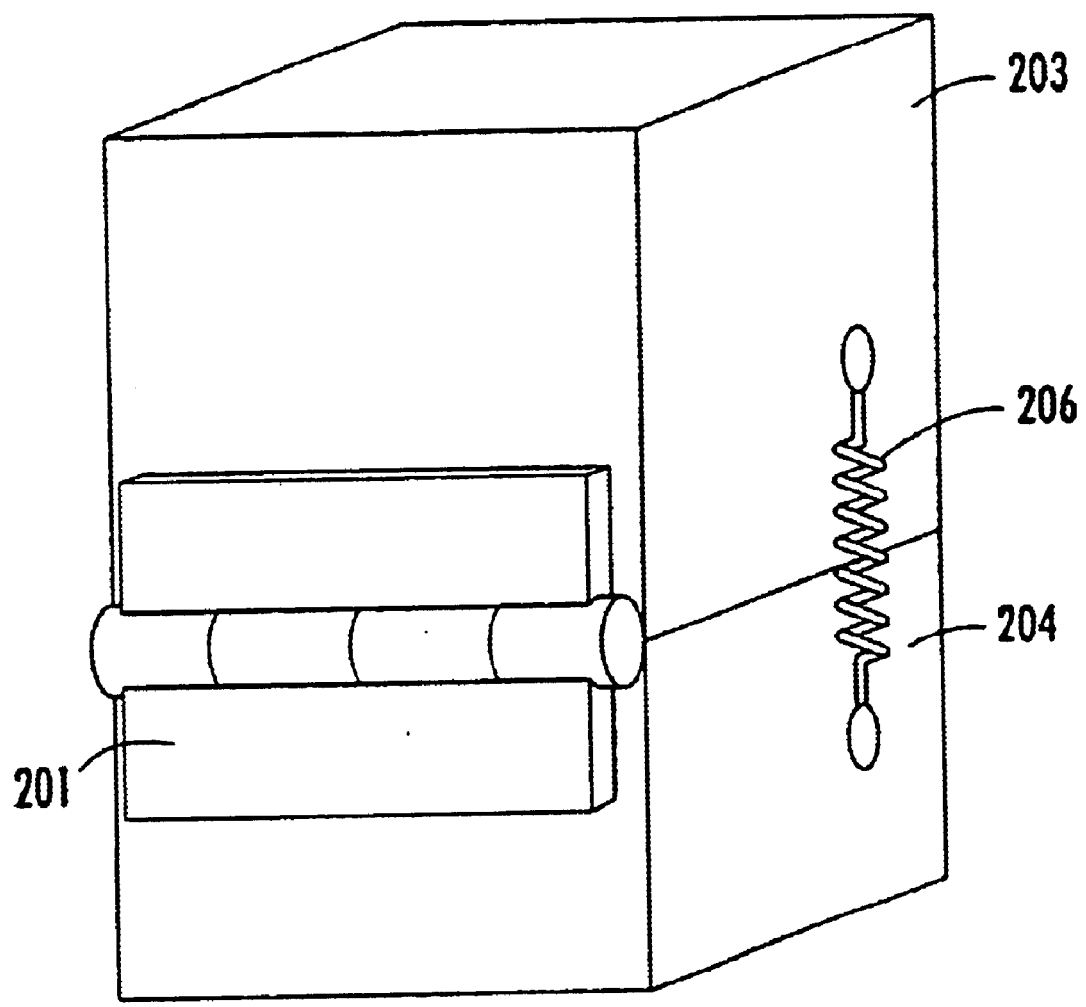
FIGS. 17–19 are partial schematic views showing various types of hinge designs useful in accordance with the various embodiments of the subject invention.
Figure 18:
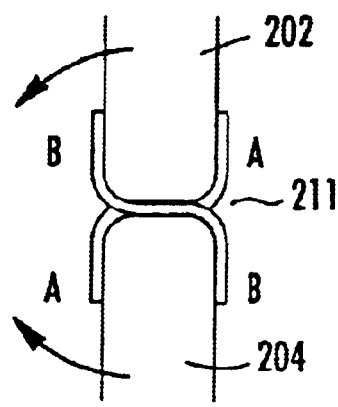
Figure 19:
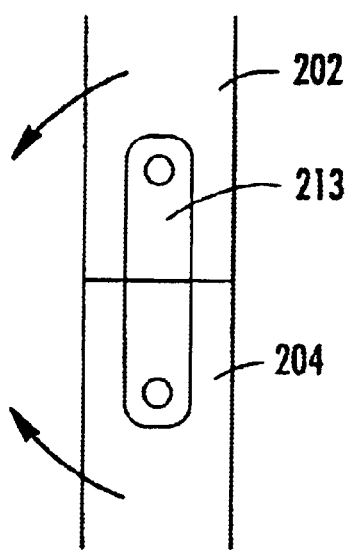

In any embodiment, it is useful to lock the first and second structural sections together in their open deployed configuration. As shown in FIGS. 1 and 14, the open configuration of the two sections prevents folding of the hinged joint between them. But, locking hinge 201 FIG. 17, as known in the art, between stiffener 203 and 204 may also be used. Also, it may prove useful to bias the two structural sections and their corresponding stiffeners to be longitudinally aligned. Means such as "over-the-center" devices schematically shown as spring 206 in FIG. 17 makes it easier to fold stiffener 203 down and stiffener 204 up and to control the unfolding force of the two structures. Alternatively, if spring 206 is a torsional spring, it will lock stiffener 203 with respect to stiffener 204. Thus, combinations of compression and tension springs may be used in addition tc or supplementing over-the-center devices and locking hinges and/or other types of locking mechanisms such as latches and the like. Hinge 201 may be a piano hinge, for example. FIGS. 18–19 show alternative hinge designs. FIG. 18 shows tape style hinge 211 wherein one part is attached to the front of stiffener 202 203 and the back of stiffener 204 and another part is attached to the back of stiffener 203 and the front of stiffener 204. FIG. 19 shows bar hinge 213 disposed on the sides of stiffeners 203 and 204.

Hinge 200 may be a piano hinge, for example. FIGS. 18–19 show alternative hinge designs. FIG. 18 show tape style hinge 210 wherein one part is attached to the front of stiffener 202 and the back of stiffener 204 and another part is attached to the back of stiffener 202 and the front of stiffener 204. FIG. 19 shows bar hinge 212 disposed on the sides of stiffeners 202 and 204.

This invention thus provides a tube which can be folded flat and therefore useful in space applications and in other structures wherein a member or a truss structure is to be compactly stored and then easily deployed. The flat folding tube of this invention exhibits excellent packaging efficiency and allows the use of very high stiffness, brittle materials, providing a very high stiffness-to-weight system. The flat folding tube of this invention can be made of a variety of different types of materials and is simple to manufacture, use and deploy. The flat folding tube is useful alone as a boom, or in a truss structure as a longeron member. Column stiffness is greatly improved and yet the structure can still be folded flat without yielding the tube material.

Preferably, improved stiffness is effected by at least two longitudinally aligned hingedly connected tube sections each including longitudinally extending stiffeners which add to the cross sectional area of the tube sections thus increasing their stiffness in the deployed state and yet both tube sections can still be folded flat for compact storage.

Figure 22:
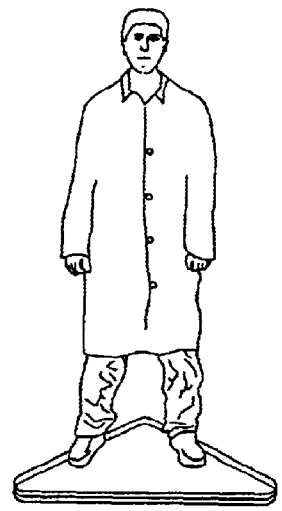
FIGS. 20–22 are schematic views showing a truss structure formed in accordance with this invention.
Figure 21:
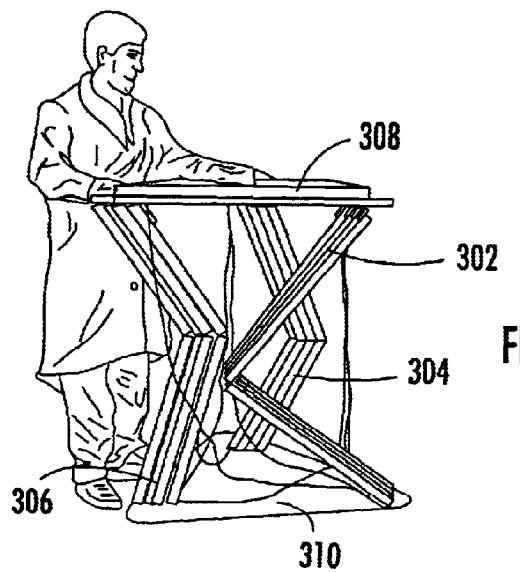
Figure 20:
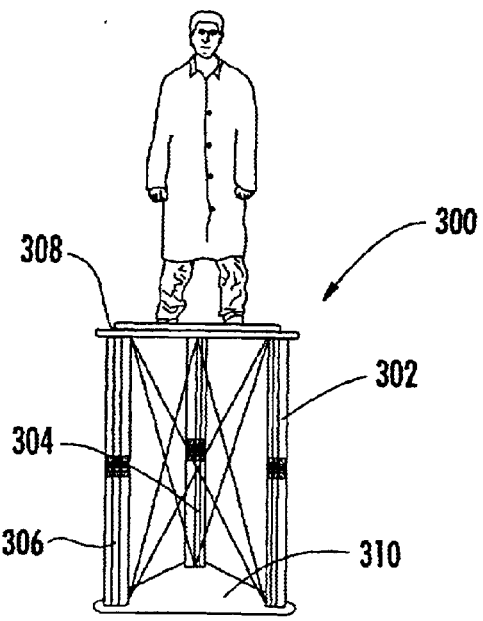

FIG. 20 depicts collapsible truss structure 300 made of a plurality of foldable members 302, 304, and 306 configured as shown in FIGS. 5–10 spanning panels 308 and 310. FIG. 21 shows foldable members 302, 304, and 306 being folded, and FIG. 22 shows the truss structure completely collapsed.

Although specific features of the invention are shown in some drawings and not in others, however, this is for convenience only as each feature may be combined with any or all of the other features in accordance with the invention. Also, the words "including", "comprising", "having", and "with" as used herein are to be interpreted broadly and comprehensively and are not limited to any physical interconnection. Moreover, any embodiments disclosed in the subject application are not to be taken as the only possible embodiments: Other embodiments will occur to those skilled in the art and are within the following claims:

What is claimed is:

1. A foldable member comprising:
   a first structural section foldable flat and biased to have an open configuration, said first structural section including a number of spaced stiffeners extending longitudinally along the entire or substantially the entire length of said first structural section;
   a second structural section also foldable flat and biased to have an open configuration, the second structural section longitudinally aligned with the first structural section when both structural sections are in the open configuration, said second structural section also including a number of spaced stiffeners extending longitudinally along the entire or substantially the entire length of said second structural section; and
   a hinged connection between the first and second structural sections for folding the first structural section against the second structural section when both structural sections are folded flat.

2. The foldable member of claim 1 in which the stiffeners of the first section are hingedly attached to the stiffeners of the second structural section.

3. The foldable member of claim 1 in which the first structural section includes a foldable tube interconnecting the spaced stiffeners of the first structural section and the second structural section includes a foldable tube interconnecting the spaced stiffeners of the second structural section.

4. The foldable member of claim 3 in which both foldable tubes have a wall thickness $t_1$, the stiffeners have a thickness $t_2$, and $t_1 << t_2$.

5. The foldable member of claim 1 in which the first structural section includes a plurality of flexible struts interconnecting the spaced stiffeners of the first structural section and the second structural section also includes a plurality of flexible struts interconnecting the spaced stiffeners of the second structural section.

6. The foldable member of claim 1 in which, when the first and second structural sections are folded flat, the stiffeners are interstitially arranged.

7. The foldable member of claim 1 in which the stiffeners of the first section are attached to the stiffeners of the second section by discrete hinges all of which fold in the same direction where the two structural sections are folded flat.

8. The foldable member of claim 1 in which the number of spaced stiffeners extending longitudinally of the first structural section are integral with the first section, and the number of spaced stiffeners extending longitudinally of the second structural section are integral with the second section.

9. The foldable member of claim 1 in which the first and second structural sections are circumferentially continuous.

10. The foldable member of claim 1 further including means for locking the first structural section in its open configuration with respect to the second structural section in its open configuration.

11. The foldable member of claim 1 further including means for biasing the first section to be longitudinally aligned with the second section.

12. The foldable member of claim 1 in which both sections are foldable flat by compressing opposite sides of the sections together.

13. The foldable member of claim 1 in which both sections are foldable flat by unfurling them.

14. A foldable member comprising:
   a first structural section including a number of spaced stiffeners extending longitudinally along the entire or substantially the entire length of said first structural section;
   a second structural section including a number of spaced stiffeners extending longitudinally along the entire or substantially the entire length of said second structural section and axially aligned with the longitudinally extending spaced stiffeners of the first section; and
   a hinged connection between the first and second structural sections for folding the first structural section against the second structural section.

15. The foldable member of claim 14 in which the hinged connection includes a discrete hinge between the proximal end of each stiffener of the first structural section and the proximal end of each axially aligned stiffener of the second structural section.

16. The foldable member of claim 14 in which the first structural section includes material interconnecting the longitudinally extending stiffeners thereof, said material biased to have an open configuration, the second structural section also including material interconnecting the longitudinally extending stiffeners thereof, said material also biased to have an open configuration.

17. The foldable member of claim 16 in which said material and said stiffeners are integral.

18. The foldable member of claim 16 in which said material and said stiffeners are made of composite material.

19. The foldable member of claim 16 in which the material has a wall thickness $t_1$, the stiffeners have a thickness $t_2$, and $t_1 \ll t_2$.

20. The foldable member of claim 16 in which said material forms a foldable tube.

21. The foldable member of claim 16 in which said material forms a plurality of flexible struts.

22. The foldable member of claim 16 in which said material forms an unfurlable tube.

23. The foldable member of claim 14 in which the first and second structural sections are circumferentially continuous.

24. The foldable member of claim 14 in which the first structural section includes a plurality of flexible struts interconnecting the stiffeners of the first structural section and the second structural section also includes a plurality of struts interconnecting stiffeners of the second structural section.

25. The foldable member of claim 14 further including means for locking the first structural section in its open configuration with respect to the second structural section in its open configuration.

26. A foldable member comprising:
   a first structural section including spaced stiffeners extending longitudinally along the entire or substantially the entire length of said first structural section, the first structural section biased into an open configuration but unfurlable into a flat configuration;
   a second structural section also including spaced stiffeners extending longitudinally along the entire or substantially the entire length of said second structural section, the second structural section biased into an open configuration but unfurlable into a flat configuration; and
   a hinged connection between the first and second structural sections such that when they are both unfurled they can be folded together about each other.

27. The foldable member of claim 26 in which the hinged connection includes a pliable hinge interconnecting the proximal end of the first section to the proximal end of the second section.

28. The foldable member of claim 26 in which the hinged connection includes discrete hinges each interconnecting a stiffener of the first section to a stiffener of the second section.

29. The foldable member of clair 26 in which the first section forms a tube and the second section forms a tube.

30. The foldable member of claim 29 in which the stiffeners are integral with the tubes.

31. The foldable member of claim 29 in which both tubes have a wall thickness $t_1$, the stiffeners have a thickness $t_2$, and $t_1 \ll t_2$.

32. A collapsible truss structure comprising at least one foldable member including:
   a first structural section foldable flat and biased to have an open configuration, said first structural section including a number of spaced stiffeners extending longitudinally along the entire or substantially the entire length of said first structural section;
   a second structural section also foldable flat and biased to have an open configuration, the second section longitudinally aligned with the first structural section when both structural sections are in the open configuration, said second structural section including a number of spaced stiffeners extending longitudinally along the entire or substantially the entire length of said second structural section; and
   a hinged connection between the first and second structural sections for folding the first structural section against the second structural section when both structural sections are folded flat.

33. A collapsible truss structure comprising at least one foldable member including:
   a first structural section including a number of stiffeners extending longitudinally along the entire or substantially the entire length of said first structural section;
   a second structural section including a number of stiffeners extending longitudinally along the entire or substantially the entire length of said second structural section and axially aligned with the longitudinally extending stiffeners of the first section; and
   a hinged connection between the first and second structural sections for folding the first structural section against the second structural section.

34. A foldable member comprising:
   a first structural section foldable flat and biased to have an open configuration, said first structural section including a number of spaced stiffeners extending longitudinally and a plurality of flexible struts interconnecting the spaced stiffeners;
   a second structural section also foldable flat and biased to have an open configuration, said second structural section including a number of spaced stiffeners extending longitudinally and a plurality of flexible struts interconnecting the spaced stiffeners, the second section longitudinally aligned with the first structural section when both structural sections are in the open configuration; and
   a hinged connection between the first and second structural sections for folding the first structural section against the second structural section when both structural sections are folded flat.

35. A foldable member comprising:
   a first structural section foldable flat and biased to have an open configuration, said first structural section including a number of spaced stiffeners extending longitudinally;
   a second structural section also foldable flat and biased to have an open configuration, said second structural section including a number of spaced stiffeners extending longitudinally, the second section longitudinally aligned with the first structural section when both structural sections are in the open configuration; and
   a hinged connection between the first and second structural sections for folding the first structural section against the second structural section when both structural sections are folded flat, wherein the stiffeners are interstitially arranged when the first and second structural sections are folded flat.

36. A foldable member comprising:
   a first structural section including a number of longitudinally extending stiffeners, and material forming a plurality of flexible struts interconnecting said longitudinally extending stiffeners of the first structural section, said material biased to have an open configuration;

a second structural section including a number of longitudinally extending stiffeners axially aligned with the longitudinally extending stiffeners of the first section, and material forming a plurality of flexible struts interconnecting said longitudinally extending stiffeners of the second structural section, said material biased to have an open configuration; and a hinged connection between the first and second structural sections for folding the first structural section against the second structural section.

37. The foldable member of claim 36 in which said material forms a foldable tube.

38. The foldable member of claim 36 in which said material forms an unfurlable tube.

39. The foldable member of claim 36 in which said material and said stiffeners are integral.

40. The foldable member of claim 36 in which said material and said stiffeners are made of composite material.

41. A foldable member comprising:

a first structural section including a number of longitudinally extending stiffeners and a plurality of flexible struts interconnecting the stiffeners of the first structural section;

a second structural section including a number of longitudinally extending stiffeners and a plurality of flexible struts interconnecting the stiffeners of the first structural section, said second structural section axially aligned with the longitudinally extending stiffeners of the first section; and a hinged connection between the first and second structural sections for folding the first structural section against the second structural section.

42. A foldable member comprising:

a first structural section including a number of longitudinally extending stiffeners, with material interconnecting said longitudinally extending stiffeners of the first structural section, said material biased to have an open configuration and having a thickness $t_1 <<$ than the thickness of the stiffeners $t_2$;

a second structural section including a number of longitudinally extending stiffeners axially aligned with the longitudinally extending stiffeners of the first section, with material interconnecting said longitudinally extending stiffeners of the second structural section, said material biased to have an open configuration and having a thickness $t_1 <<$ than the thickness of the stiffeners $t_2$; and a hinged connection between the first and second structural sections for folding the first structural section against the second structural section.

43. A foldable member comprising:

a first structural section including spaced stiffeners extending longitudinally, the first structural section biased into an open configuration but unfurlable into a flat configuration;

a second structural section also including spaced stiffeners extending longitudinally, the second section biased into an open configuration but unfurlable into a flat configuration; and a pliable hinged connection between the first and second structural sections such that when they are both unfurled they can be folded together about each other, the pliable hinge interconnecting the proximal end of the first section to the proximal end of the second section.

44. A foldable member comprising:

a first structural section foldable flat and biased to have an open configuration, said first structural section including a number of spaced stiffeners extending longitudinally and beyond an edge of said first structural section;

a second structural section also foldable flat and biased to have an open configuration, the second structural section longitudinally aligned with the first structural section when both structural sections are in the open configuration, said second structural section also including a number of spaced stiffeners extending longitudinally and beyond an edge of said second structural section; and a hinged connection between the first and second structural sections for folding the first structural section against the second structural section when both structural sections are folded flat.

45. A foldable member comprising:

a first structural section foldable flat and biased to have an open configuration, said first structural section including at least one spaced stiffener extending longitudinally along the entire or substantially the entire length of said first structural section;

a second structural section also foldable flat and biased to have an open configuration, the second structural section longitudinally aligned with the first structural section when both structural sections are in the open configuration, said second structural section also including at least one spaced stiffener extending longitudinally along the entire or substantially the entire length of said second structural section; and a hinged connection between the first and second structural sections for folding the first structural section against the second structural section when both structural sections are folded flat.

46. A foldable member comprising:

a first structural section foldable flat and biased to have an open configuration, said first structural section including a number of spaced stiffeners extending longitudinally along the length of said first structural section, said spaced stiffeners configured to increase stiffness and strength of the first structural section;

a second structural section also foldable flat and biased to have an open configuration, the second structural section longitudinally aligned with the first structural section when both structural sections are in the open configuration, said second structural section also including a number of spaced stiffeners extending longitudinally along the length of said second structural section, said spaced stiffeners configured to increase stiffness and strength of the second structural section; and a hinged connection between the first and second structural sections for folding the first structural section against the second structural section when both structural sections are folded flat.

47. A foldable member comprising:

a first structural section foldable flat and biased to have an open configuration, said first structural section including a number of spaced lengthy stiffeners extending longitudinally along a majority of the length of said first structural section;

a second structural section also foldable flat and biased to have an open configuration, the second structural section longitudinally aligned with the first structural section when both structural sections are in the open configuration, said second structural section also including a number of spaced lengthy stiffeners extending longitudinally along a majority of the length of said second structural section; and a hinged connection between the first and second structural sections for folding the first structural section against the second structural section when both structural sections are folded flat.

* * * * *